(12) United States Patent
Senoo

(10) Patent No.: US 7,905,059 B2
(45) Date of Patent: Mar. 15, 2011

(54) DOOR LINING FIXING CONSTRUCTION AND DOOR LINING FIXING METHOD

(75) Inventor: Katsuhiro Senoo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 645 days.

(21) Appl. No.: 11/780,555

(22) Filed: Jul. 20, 2007

(65) Prior Publication Data

US 2008/0022602 A1  Jan. 31, 2008

(30) Foreign Application Priority Data

Jul. 26, 2006  (JP) .................................. 2006-203191

(51) Int. Cl.
*E06B 3/00* (2006.01)

(52) U.S. Cl. ........ 49/503; 296/153; 296/146.7; 296/1.09

(58) Field of Classification Search .................... 49/502, 49/503; 296/146.1, 153, 146.7, 1.09
See application file for complete search history.

(56) References Cited

U.S. PATENT DOCUMENTS

| | | | | |
|---|---|---|---|---|
| 5,377,450 A | * | 1/1995 | Varajon ............................ | 49/502 |
| 5,529,370 A | * | 6/1996 | Veit ............................. | 296/146.7 |
| 5,584,144 A | * | 12/1996 | Hisano ............................ | 49/502 |
| 5,820,191 A | * | 10/1998 | Blakewood et al. ........ | 296/37.13 |
| 5,884,434 A | * | 3/1999 | Dedrich et al. .................. | 49/503 |
| 6,123,385 A | * | 9/2000 | Bailey et al. ................ | 296/146.7 |
| 6,170,199 B1 | * | 1/2001 | Stenzel et al. .................. | 49/502 |
| 6,438,899 B1 | * | 8/2002 | Feder et al. .................... | 49/502 |
| 6,453,615 B1 | * | 9/2002 | Berta et al. ..................... | 49/349 |
| 6,615,546 B2 | * | 9/2003 | Furuyama et al. .............. | 49/502 |
| 6,616,216 B2 | * | 9/2003 | Furuyama et al. ......... | 296/146.7 |
| 6,857,688 B2 | * | 2/2005 | Morrison et al. .......... | 296/146.7 |
| 7,380,864 B2 | * | 6/2008 | Guanzon et al. ........... | 296/146.1 |
| 7,549,689 B2 | * | 6/2009 | Pinkerton et al. ............ | 296/1.02 |
| 2002/0047289 A1 | * | 4/2002 | Furuyama et al. ......... | 296/146.7 |
| 2008/0141592 A1 | * | 6/2008 | Nakajima ....................... | 49/502 |

FOREIGN PATENT DOCUMENTS

| | | | | |
|---|---|---|---|---|
| GB | 2059370 | A | * | 4/1981 |
| JP | 03139446 | A | * | 6/1991 |
| JP | 6-32174 | | | 4/1994 |

* cited by examiner

Primary Examiner — Jerry Redman
(74) Attorney, Agent, or Firm — Rankin, Hill & Clark LLP

(57) ABSTRACT

This door lining fixing construction is constructed such that: an assist grip provided on a vehicle interior side of a door lining is fixed to a bracket provided on a vehicle exterior side of the door lining; the bracket is extended to an inner handle opening that is formed in the door lining; the bracket is fixed to a door inner panel through the inner handle opening; an inner handle is disposed between the bracket and the door lining; and an operation hole is formed in the inner handle for fixing the bracket to the door inner panel.

2 Claims, 3 Drawing Sheets sec A-A'   sec B-B'

DOOR LINING FIXING CONSTRUCTION AND DOOR LINING FIXING METHOD

Priority is claimed on Japanese Patent Application No. 2006-203191, filed on Jul. 26, 2006, the content of which is incorporated herein by reference.

BACKGROUND OF THE INVENTION

1. Field of the Invention

The present invention relates to a door lining fixing construction and a door lining fixing method, and more specifically, to an improvement in the assembly operation for fixing a door lining.

2. Description of Related Art

As an example of a door lining fixing construction, there is a design in which the core member of the assist grip is extended into and passed through an opening in the door lining that is employed for the inner handle, thereby fixing the assist grip in the door inner panel (see Japanese Unexamined Utility Model Application, First Publication No. H06-32174, for example).

In the above-described door lining fixing construction, however, once the door lining, with the assist grip temporarily fixed thereto, is fixed in place to the door inner panel, the inner handle must be attached from the interior side of the door lining. As a result, the operation of connecting the inner handle wiring between the door lining and the door inner panel is troublesome and time-consuming.

The present invention has an object of providing a door lining fixing construction and a door lining fixing method that enable an improvement in the easiness for fixing the door lining.

SUMMARY OF THE INVENTION

The present invention employs the followings to achieve the aforementioned object.

Namely, the present invention employs a door lining fixing construction, wherein: an assist grip provided on a vehicle interior side of a door lining is fixed to a bracket provided on a vehicle exterior side of the door lining; the bracket is extended to an inner handle opening that is formed in the door lining; the bracket is fixed to a door inner panel through the inner handle opening; an inner handle is disposed between the bracket and the door lining; and an operation hole is formed in the inner handle for fixing the bracket to the door inner panel.

According to the door lining fixing construction, the inner handle is disposed between the bracket and the door lining, i.e., is disposed to the door inner panel side of the door lining. As a result, the inner panel can be wired in advance to the door inner panel side. Accordingly, it is possible to improve the efficiency of the assembly operation when fixing the door lining in place. Further, by fixing the assist grip provided on the interior side of the door lining into the bracket provided on the exterior side of the door lining, the fixing part for the assist grip is not visible on the interior side of the vehicle. As a result, the appearance is improved.

It may be arranged such that the bracket includes: a first extending part that extends in a direction away from the door lining in the vicinity of the inner handle opening; and a second extending part that extends from a front end of the first extending part towards an inside of the inner handle opening along the door lining.

In this case, the inner handle is guided by the second extending means, so that it becomes possible to provide excellent disposition of the inner handle between the bracket and the door lining.

In addition, the present invention also employs a door lining fixing method including: fixing an assist grip to a bracket through a door lining; disposing an inner handle between the door lining and an extending part of a bracket, that extends to an inner handle opening; forming a door lining assembly by temporarily fixing the inner handle to the door lining; and fixing the bracket of the door lining assembly to the door inner panel through an operation hole formed in the inner handle.

According to the door lining fixing method as described above, the door lining assembly can be fixed into the door inner panel with the inner panel already wired to the door inner panel side. Accordingly, an efficiency improvement in the assembly operation when fixing the door lining in place can be achieved.

DETAILED DESCRIPTION OF THE INVENTION

An embodiment of the present invention will be explained below with reference to the drawings.

Figure 1:
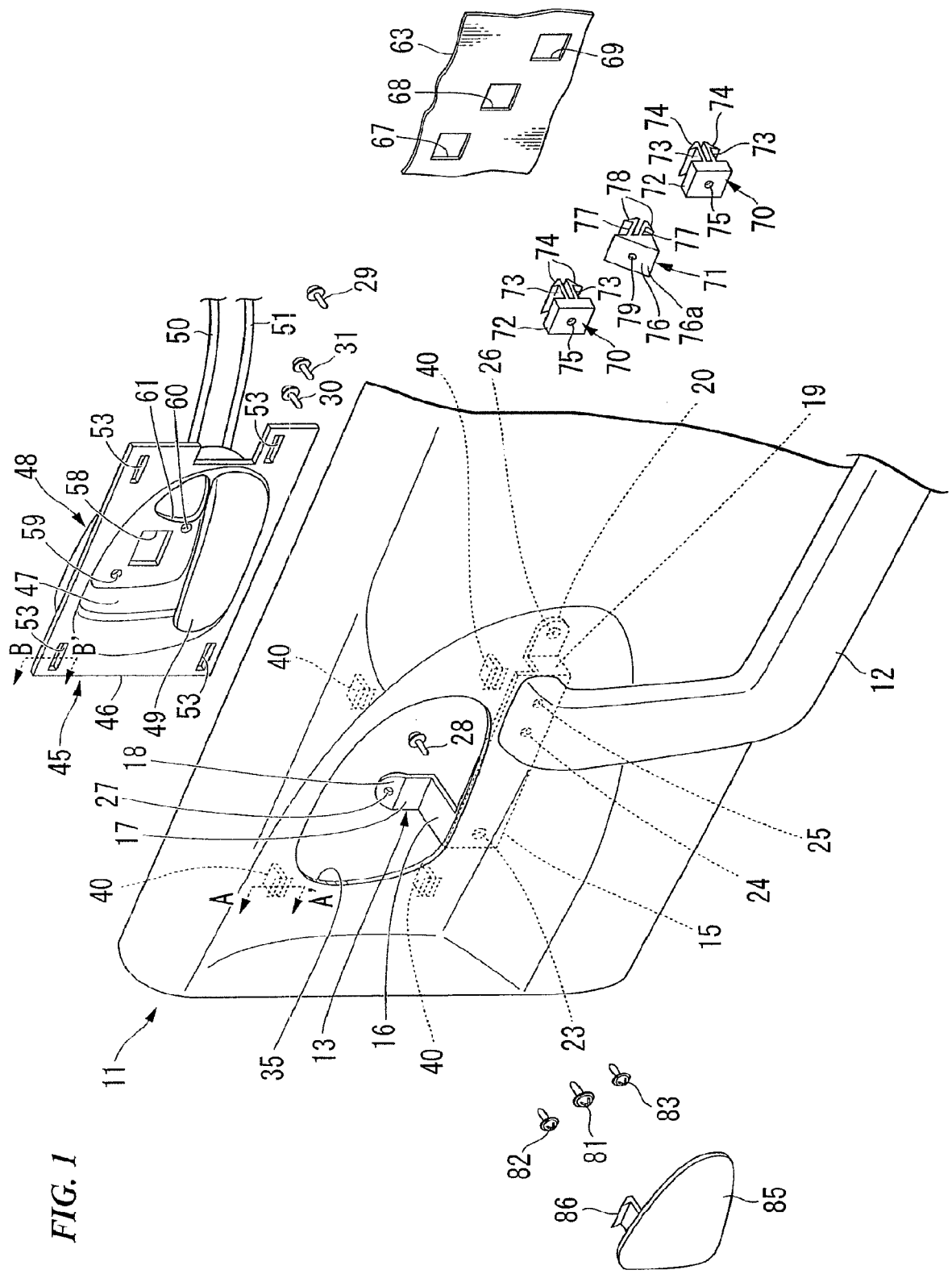
FIG. 1 is an exploded perspective view of a door lining fixing construction according to an embodiment of the present invention.

FIG. 1 is an exploded perspective view of the door lining fixing construction as seen from the vehicle interior.

The upper end of the front part of an assist grip 12, which is gripped by the passenger when opening or closing the door, is passed through the door lining 11 and attaches to a metal bracket 13 provided on the vehicle exterior side of the door lining 11.

Figure 2:
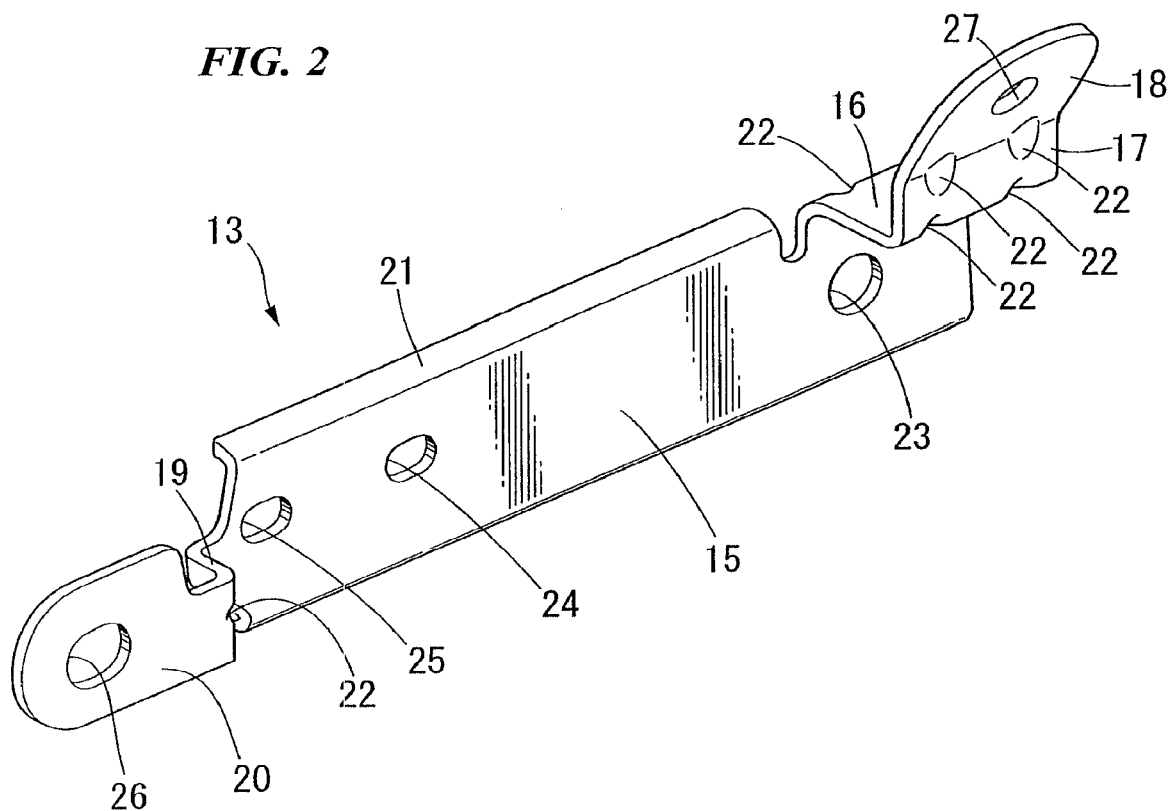
FIG. 2 is a perspective view of a bracket of the door lining fixing construction.

As shown in FIG. 2, this bracket 13 is provided with a base part 15 which is roughly rectangular in shape and long in the horizontal direction; a first plate part (first extending part) 16 that extends from the upper edge of one end in the longitudinal direction of the base part 15 so as to form a perpendicular to the base part 15; a second plate part (second extending part) 17 that extends in the upward direction from the first plate part 16 end edge part that is opposite the base part 15 so as to form a perpendicular to the first plate part 16; and a third plate part 18 that extends from the second plate part 17 end edge part that is opposite the first plate part 16, in the upward direction while inclining away from the base part 15. The bracket 13 is further provided with a forth plate part 19 that extends in the same direction as the first plate part 16 from the other end of the base part 15 and so as to form a perpendicular with the base part 15; and a fifth plate part 20 that extends from the forth plate part 19 end edge part that is opposite the base part 15, in a direction away from and parallel to the base part 15. In addition, the bracket 13 also has an upper plate part 21 extending from the top edge of the base part 15, this upper plate part 21 projecting toward the side opposite to that of the first plate part 16 with respect to the base part 15.

Respective reinforcing beads 22 are formed to the curved part of the border between the base part 15 and the first plate part 16, the curved part of the border between the first plate part 16 and the second plate part 17, the curved part of the border between the second plate part 17 and the third plate part 18, the curved part of the border between the base part 15 and the fourth plate 19, and the border between the forth plate part 19 and the fifth plate part 20. A penetrating attachment hole 23 is formed near the first plate part 16. Penetrating attachment holes 24, 25 are also formed separated from one another along the length direction of the base part 15 near the forth plate part 19. In addition, a penetrating attachment hole 26 is formed in the fifth plate part 20, and a penetrating attachment hole 27 is formed in the third plate part 18.

As shown in FIG. 1, this type of bracket 13 is disposed to a specific position on the vehicle exterior side of the door lining 11 and is fixed in place to the door lining 11 by means of a screw 28 that is inserted from the vehicle exterior side into the attachment hole 23 in the base part 15, and a screw 29 that is inserted from the vehicle exterior side into the attachment hole 26 in the fifth plate part 20. In addition, a screw 30 which is inserted into the attachment hole 24 in the base part 15 and an attachment hole, not shown in the figures, in the door lining 11, screws into and is tightened in a screw hole, not shown, that is formed in the vehicle exterior side of the assist grip 12. In addition, a screw 31 which is inserted into the attachment hole 25 in the base part 15 and an attachment hole, not shown in the figures, in the door lining 11, screws into and is tightened in a screw hole, not shown, that is formed in the vehicle exterior side of the assist grip 12. As a result, the top end of the front part of the assist grip 12 is fixed into the door lining 11 and the bracket 13.

Figure 3:
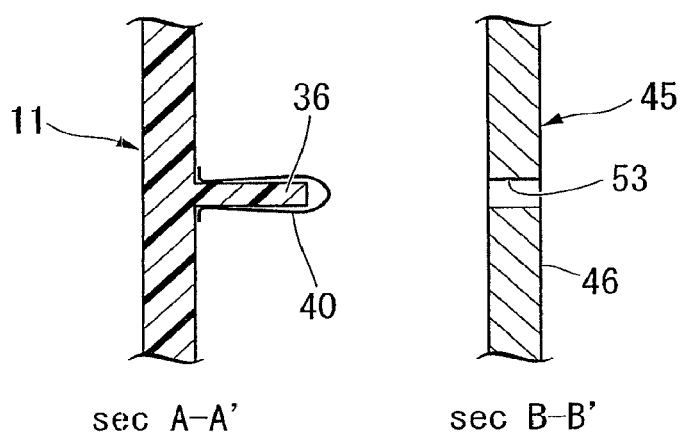
FIG. 3 is a cross-sectional view showing the temporary fixing construction in the door lining fixing construction.

An inner handle opening 35 which passes through the door lining 11 and is used for the inner handle is formed near, i.e., in front of and above, the position of attachment of the assist grip 12 in the door lining 11. As shown in FIG. 3, horizontally long, plate-shaped engaging pieces 36 that extend toward the vehicle exterior are formed at four positions with respect to the inner handle opening 35, i.e., in front of and above, in front of and below, in back of and above, and in back of and below, the inner handle opening 35. These engaging pieces 36 are covered by respective clips 40 consisting of a spring member that is roughly U-shaped in form.

As shown in FIG. 1, the bracket 13 which has been attached to the door lining 11 is disposed so that the first plate part 16 extends toward the vehicle exterior from the door lining 11 at a point that is slightly below the lower edge of the inner handle opening 35, and so that the second plate part 17 extends toward the inside of the inner handle opening 35 from the front end of the first plate part 16 along the door lining 11. This results in the third plate part 18 being disposed inside of the inner handle opening 35 when seen from the vehicle interior side.

In addition, in this embodiment, an inner handle 45, which is for the door opening operation, is provided to the vehicle exterior side of the door lining 11. This inner handle 45 has a base member 48 having a contact plate 46 and a concave part 47; a handle main body 49 that is connected to the bottom part of the concave part 47 in the base member 48, in a manner so as to permit its rotation about the vertical axis; and cables 50, 51 which are provided on the vehicle exterior side of the concave part 47 and communicate the rotational force of the handle main body 49.

Horizontally long engaging holes 53 are formed at each of the four corners of the contact plate 46.

A roughly square-shaped operation hole 58 is formed through a specific site at the center of the bottom part of the concave part 47, and penetrating attachment holes 59, 60 are formed at the periphery of this operation hole 58. In addition, another operation hole 61 is formed behind the operation hole 58.

Figure 4:
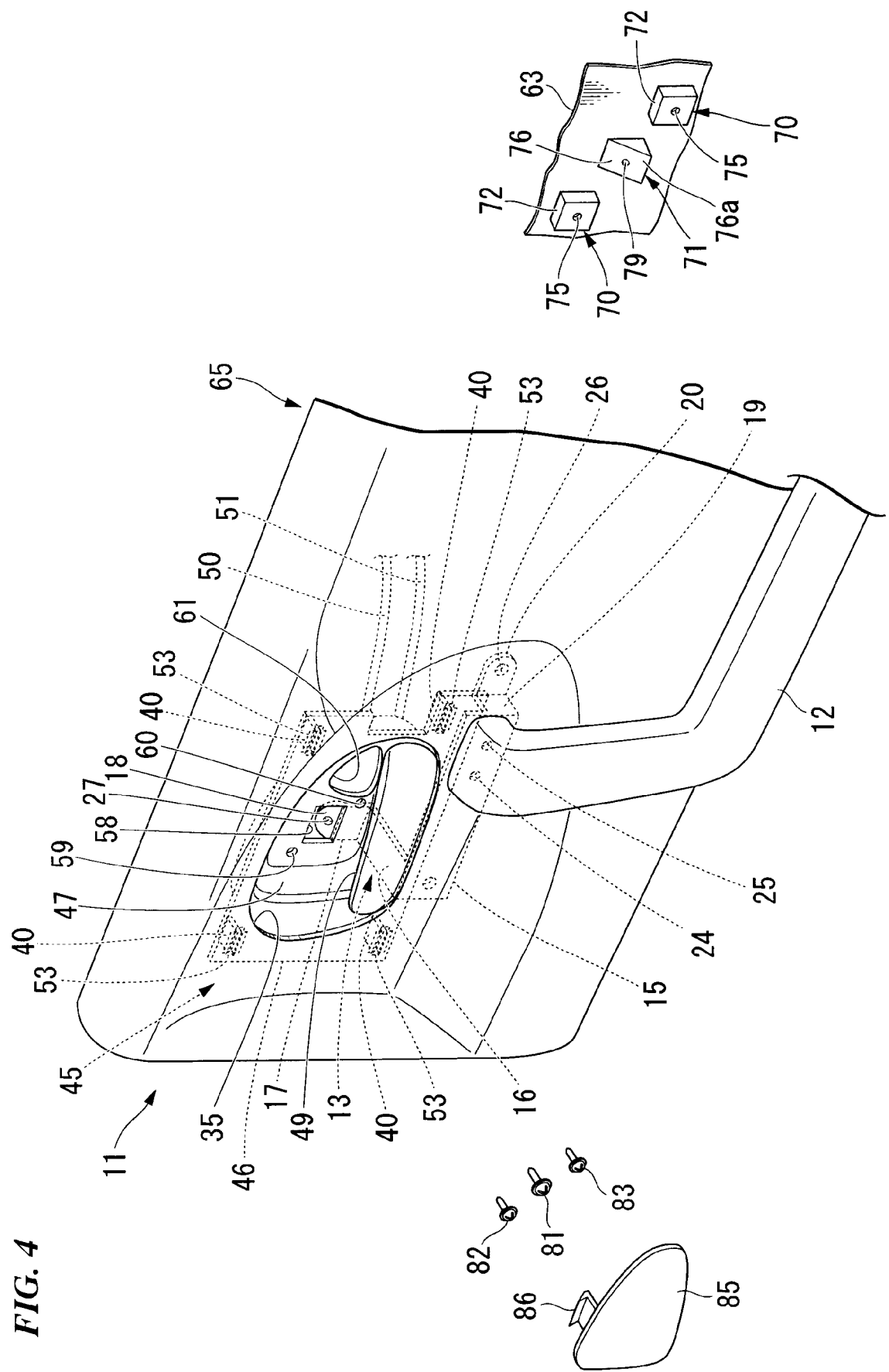
FIG. 4 is a perspective view of a door lining assembly prior to attaching to a door inner panel, in the door lining fixing construction.

This inner handle 45, in which cables 50, 51 have already been connected to associated parts, not shown in the figures, on the door inner panel 63 side, is disposed from the vehicle exterior side of the door lining 11, between the second plate part 17 of the bracket 13 and the door lining 11. The inner handle 45 is then moved toward the door lining 11 side, thereby engaging each of the engaging holes 53 at the four corners with their respective engaging pieces 36 and clips 40, as shown in FIG. 3 for one location only. As a result, the inner handle 45 is temporarily fixed in place on the vehicle exterior side of the door lining 11 under the biasing force of the clip 40. As shown in FIG. 4, once the inner handle 45 has been attached in this manner, the inner handle opening 35 in the door lining 11 is covered from the vehicle exterior by the inner handle 45.

A door lining assembly 65 that has been formed in the manner described above is then attached to the door inner panel 63.

As shown in FIG. 1, a plurality of square-shaped engaging holes 67, 68, 69 are formed in the door inner panel 63. Respective screw grommets 70 formed of a synthetic resin engage in engaging holes 67, 69, and a screw grommet 71 formed of a synthetic resin engages in engaging hole 68.

Screw grommet 70 has a base part 72 which has the shape of a rectangular parallelepiped; a pair of plate parts 73 that are perpendicular to the base part 72 and extend parallel to one another; and a pair of claw parts 74 that project in opposite directions from the front end of the paired plate part parts 73. The screw grommets 70 engage in the engaging holes 67, 69 as the paired plate parts 73 undergo deformation so that the paired claws 74 approach one another. Thereafter, the paired plate parts 73 return to their original position due to elastic force, so that the door inner panel 63 is held between the paired claws 74 and the base part 72. The screw grommets 70 are attached to the door inner panel 63 as a result. A screw hole 75 which is present between the paired plates 73 is formed in the base part 72.

Screw grommet 71 has a triangle prism-shaped base part 76 in which an inclined plane 76a is formed; a pair of plate parts 77 on the side of base part 76, that is opposite the inclined plane 76a that are perpendicular to the inclined plane 76a, and which extend parallel to one another; and a pair of claw parts 78 that project in opposite directions from the front end of the paired plate parts 77. The screw grommet 71 engages in the engaging hole 68 as the paired plate parts 77 undergo deformation so that the paired claws 78 approach one another. Thereafter, the paired plates 77 return to their original position due to elastic force, so that the door inner panel 63 is held between the paired claws 78 and the base part 76. The screw grommet 71 is attached to the door inner panel 63 as a result. A screw hole 79 which is present between the paired plate parts 77 is formed in the base part 76, perpendicular to the inclined plane 76a.

In the door lining assembly 65 shown in FIG. 4, the third plate part 18 of the bracket 13 comes into contact with the screw grommet 71 which is attached in the door inner panel 63, and the concave part 47 which is in the inner handle 45 comes into contact with the paired screw grommets 70 that are attached in the door inner panel 63.

Next, screw 81, which has been inserted from the vehicle interior side of the door lining 11 by being passed through the inner handle opening 35 and the operation hole 58 in the concave part 47 of the inner handle 45, is inserted into the attachment hole 27 of the third plate part 18 of the bracket 13, screwed into and tightened in the screw hole 79 of the screw grommet 71 which is engaged in the door inner panel 63. As a result, the bracket 13 and the door lining 11 fixed thereto are fixed into the door inner panel 63.

Screw 82, which has been inserted from the vehicle interior side of the door lining 11 by being passed through the inner handle opening 35, is inserted into the attachment hole 59 in the concave part 47 of the inner handle 45, screwed into and tightened in the screw hole 75 of one of the screw grommets 70 that is engaged in the door inner panel 63. Similarly, the screw 83, which has been inserted from the vehicle interior side of the door lining 11 by being passed through the inner handle opening 35, is inserted into the attachment hole 60 in the concave part 47 of the inner handle 45, screwed into and tightened in the screw hole 75 of the other screw grommet 70 that is engaged in the door inner panel 63. The inner handle 45 is fixed into the door inner panel 63 as a result. Note that the door lining 11 is fixed into the door inner panel 63 at the plurality of sites including above.

Next, the operation holes 58, 61 and the screws 82, 83 are covered and hidden from view by attaching a resin cap 85 from the vehicle interior side to the bottom part of the concave part 47 of the inner handle 45. Note that an engaging claw 86 is formed to the cap 85 for engaging in engaging holes, not shown in the figures, which are formed in the concave part 47.

In the embodiment described above, the door lining assembly 65 is formed by passing the assist grip 12 through the door lining 11 and fixing it into the bracket 13, while at the same time temporarily fixing the inner handle 45 to the door lining 11 by disposing the inner handle 45 between the door lining 11 and the second plate part 17 of the bracket 13, which extends to the inner handle opening 35. Since this design provides that the inner handle 45 is disposed between the bracket 13 and the door lining 11, i.e., to the door inner panel 63 side of the door lining 11, it is possible to wire the cables 50, 51 of the inner handle 45 to the door inner panel 63 side in advance.

In addition, the bracket 13 of the door lining assembly 65 can be fixed into the door inner panel 63 by passing through the operation hole 58 formed in the inner handle 45. Accordingly, it is possible to improve the efficiency of the assembly operation when fixing in the door lining.

In addition, by fixing the assist grip 12, which is provided on the vehicle interior side of the door lining 11, in place to the bracket 13, which is provided on the vehicle exterior side of the door lining 11, the fixing part of the assist grip 12 is not visible from inside the vehicle. As a result, the appearance is improved.

Further, near the inner handle opening 35, the bracket 13 has a first plate part 16 that extends in a direction away from the door lining 11 and a second plate part 17 that extends from the front end of the first plate part 16 toward the inside of the inner handle opening 35 along the door lining 11. As a result, the inner handle 45 is guided by the second plate part 17, to provide excellent disposition between the bracket 13 and the door lining 11.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A door lining fixing construction comprising:
    a bracket provided on a vehicle exterior side of a door lining, the bracket extending to an inner handle opening that is formed in the door lining, the bracket being fixed to a door inner panel through the inner handle opening;
    an assist grip provided on a vehicle interior side of the door lining, wherein the assist grip is fixed to the bracket provided on a vehicle exterior side of the door lining and projects from the door lining so as to be gripped by a passenger when opening or closing a door;
    an inner handle which is for a door opening operation and is separately provided from the assist grip, disposed between the bracket and the door lining, the inner handle having a handle main body and a cable which communicate a rotation force of the handle main body; and
    an operation hole formed in the inner handle for fixing the bracket to the door inner panel.

2. The door lining fixing construction according to claim 1, wherein the bracket comprises:
    a first extending part that extends in a direction away from the door lining in the vicinity of the inner handle opening; and
    a second extending part that extends from a front end of the first extending part towards an inside of the inner handle opening along the door lining.

* * * * *